(12) United States Patent  
Lu

(10) Patent No.: US 7,916,791 B2  
(45) Date of Patent: Mar. 29, 2011

(54) METHOD AND SYSTEM FOR NON-LINEAR MOTION ESTIMATION

(75) Inventor: Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 11/453,915

(22) Filed: Jun. 16, 2006

(65) Prior Publication Data

US 2007/0291844 A1  Dec. 20, 2007

(51) Int. Cl.
*H04N 7/12* (2006.01)
(52) U.S. Cl. .................. 375/240.16; 375/240.12
(58) Field of Classification Search .................. 375/240, 375/240.01, 240.12, 240.16
See application file for complete search history.

(56) References Cited

U.S. PATENT DOCUMENTS

| | | | |
|---|---|---|---|
| 5,654,761 A * | 8/1997 | Jung | ........................ 375/240.16 |
| 6,058,143 A | 5/2000 | Golin | |
| 6,285,715 B1 | 9/2001 | Ozcelik et al. | |
| 2005/0105611 A1 | 5/2005 | Bjontegaard | |
| 2005/0105617 A1 | 5/2005 | Chono | |
| 2005/0135483 A1 | 6/2005 | Nair | |

* cited by examiner

*Primary Examiner* — Allen Wong
(74) *Attorney, Agent, or Firm* — Stephen C. Kaufman, Esq.; McGinn IP Law Group, PLLC

(57) ABSTRACT

A method and system for extrapolating and interpolating a visual signal including determining a first motion vector between a first pixel position in a first image to a second pixel position in a second image, determining a second motion vector between the second pixel position in the second image and a third pixel position in a third image, determining a third motion vector between one of the first pixel position in the first image and the second pixel position in the second image, and the second pixel position in the second image and the third pixel position in the third image using a non-linear model, determining a position of the fourth pixel in a fourth image based upon the third motion vector.

20 Claims, 9 Drawing Sheets

Fig. 8
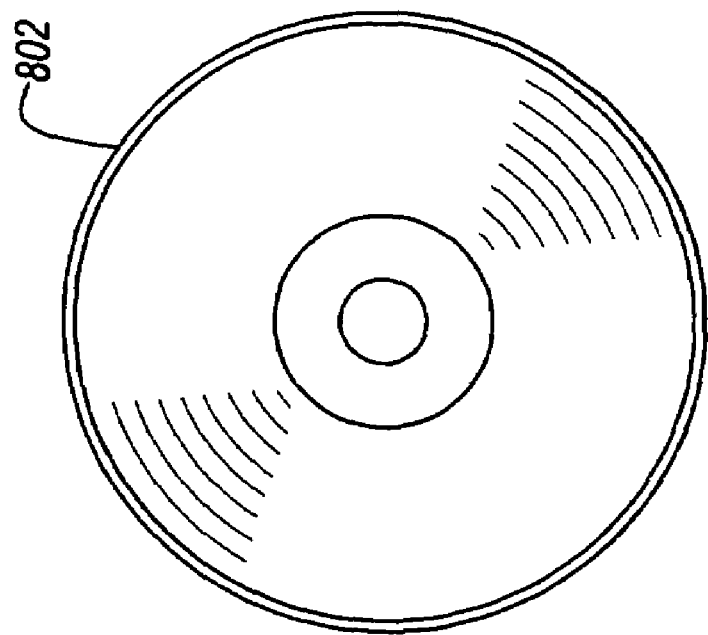
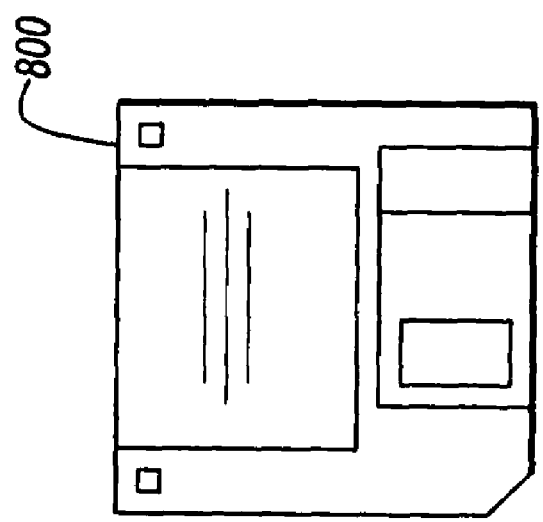

METHOD AND SYSTEM FOR NON-LINEAR MOTION ESTIMATION

The invention described herein was made in the performance of work under NASA Contract No. NNS05AA75C and is subject to the provisions of Section 305 of the National Aeronautics and Space Act of 1958 (72 U.S.C. 2457).

BACKGROUND OF THE INVENTION

1. Field of the Invention

The present invention relates generally to a method and system for non-linear motion estimation. More specifically, the present invention employs a non-linear motion estimation process for improved side information extrapolation and interpolation in Wyner-Ziv video decoding systems.

2. Description of the Related Art

Extrapolation and interpolation of a visual signal, such as, image, video, and graphic signals, have been widely used in various contexts, including, but not limited to: video-coding, trans-coding, error concealment, frame rate conversion, pre-processing, and interactive rendering.

For instance, techniques for extrapolating and interpolating in video-coding applications have been described by Aaron et al., in *Toward Practical Wyner-Ziv Coding of Video*, PROC. IEEE INT. CONF ON IMAGE PROCESSING, pp. 869-872, Barcelona, Spain, Spet. (2003), Puri et al., *PRISM: A New Robust Video Coding Architecture based on Distributed Compression Principles*, ALLERTON CONFERENCE ON COMMUNICATION, CONTROL AND COMPUTING, (2002), and Yaman et al., *A Low-Complexity Video Encoder with Decoder Motion Estimation*, Proc. ICASSP, Montreal, Canada, (2004).

Techniques for extrapolating and interpolating in transcoding applications have been described by U.S. Pat. No. 6,058,143 issued on May 2, 2000, to Golin for "Motion Vector Extrapolation for Transcoding Video Sequences."

Further, techniques for extrapolating and interpolating in error concealment for video decoding or post-processing applications have been described by Peng et al., *Block-Based Temporal Error Concealment for Video Packet Using Motion Vector Extrapolation*, International Conf. on Communications, Circuits, Systems and West Sino Expo, pp. 10-14, Jun. 29-Jul. 1, (2002) and by U.S. Pat. No. 6,285,715 issued on Sep. 4, 2001, to Ozcelik for "Methods and Apparatus for Error Concealment While Decoding a Coded Video Bit Stream."

The visual signal extrapolation and interpolation methods that are conventionally used in video coding, trans-coding, error concealment, video decoding, frame rate conversion, and post-processing applications are based on an assumption that motion is linear. Therefore, these methods are referred to as linear motion-based extrapolation and interpolation methods.

One example that employs a linear motion-based extrapolation/interpolation method is the Wyner-Ziv video coding technique. A typical Wyner-Ziv video coding system includes a video encoder and a video decoder. The video encoder is a low complexity and low power encoder. The computation-heavy signal processing tasks, such as the motion estimation, are performed at the decoder.

In order to decode the received video signals and reconstruct the video, a Wyner-Ziv decoder needs to exploit a correlation between source information and side information, which is only available at the decoder. The source information is the video signal (e.g., a picture) to be encoded by the encoder and transmitted to the decoder for decoding, and the side information is an estimate of the picture to be decoded. The side information is generated at the decoder.

The performance of a Wyner-Ziv coding system depends heavily on the fidelity and reliability of the side information. The closer the side information to the source, the better the performance of the system. Therefore, the method and apparatus used by the decoder to generate the side information plays a very crucial role in a Wyner-Ziv video coding system.

Typically, the decoder first performs motion estimation on previously reconstructed pictures (termed reference pictures) to generate a set of motion vectors and then uses these motion vectors to generate an estimate of the picture to be decoded by motion based extrapolation or interpolation. This estimate is used as the side information by the decoder for decoding and reconstructing the current picture.

FIG. 1 is a diagram illustrating a conventional linear motion-based temporal extrapolation process 100. Specifically, in order to extrapolate a current Picture N 106, motion estimation is first performed on at least two reference pictures, namely, Pictures N−2 102 and N−1 104, to generate a motion vector 108 for each pixel or a block of pixels in Picture N−1 104, which are indicative of the motion of the pixel or the block of pixels between Picture N−1 104 and Picture N−2 102. Then, the motion vectors 108 are manipulated according to a predetermined function that is established upon an underlying motion model or assumption. For example, if a constant linear displacement motion model is assumed, the motion vector 108 is shifted, and the pixel or the block of pixels associated with the motion vector 108 is extrapolated (i.e., mapped) from its location in Picture N−1 104 to a location defined by the motion vectors in an estimate of the current Picture N 106.

Note that a motion vector 108 can also be constructed for each pixel or a block of pixels in Picture N−2 102 to indicate the motion between Picture N−2 102 and Picture N−1 104. In such an incident, the motion vector 108 should then be shifted, and the pixel or the block of pixels associated with the motion vector 108 should be extrapolated or mapped from its location in Picture N−1 104 to a location defined by the shifted motion vectors in an estimate of the current Picture N 106.

The linear motion-based temporal extrapolation process as described above, therefore, creates an estimate of the current Picture N 106, after all the pixels or the blocks of pixels in Picture N−1 104 (or Picture N−2 102) are mapped.

FIG. 2 illustrates another conventional linear motion-based temporal interpolation process 200. Motion estimation is first performed on at least two reference pictures, namely, Pictures N−1 202 and N+1 206, to obtain a motion vector 208 for each pixel or a block of pixels in Picture N−1 202, which is indicative of the motion of the pixel or the block of pixels from Picture N−1 202 to Picture N+1 206. Then, the motion vector is scaled down (e.g., by a factor of 2) based on an underlying assumption for a constant linear displacement motion model, and the pixels or the blocks of pixels associated with the motion vectors are interpolated from their locations in Picture N−1 202 and/or N+1 206 to a location defined by the scaled motion vector in an estimate of the current Picture N 204.

Note that a motion vector 208 can also be constructed for each pixel or block of pixels in Picture N+1 206 to indicate the motion between Picture N+1 206 and Picture N−1 202. In such an incident, the motion vector 208 should also be scaled down (e.g., by a factor of 2), and the pixels or the blocks of pixels associated with the motion vector 208 should be interpolated from their locations in Picture N−1 202 and/or Picture N+1 206 to a location defined by the scaled motion vectors in an estimate of the current Picture N 204. The linear motion-based temporal interpolation process as described above also creates an estimate of the current Picture N 204, after all the pixels or the blocks of pixels in Picture N+1 206 (or Picture N−1 202) are mapped.

FIG. 3 illustrates a conventional linear-motion based temporal video frame (i.e., picture) extrapolation/interpolation system 300. The system 300 includes a linear motion estimation unit 302 and a motion-based extrapolation/interpolation unit 304. The linear motion estimation unit 302 receives the reference pictures and generates a motion vector based on the linear motion assumption or model. The extrapolation/interpolation unit 304 receives the motion vector from the linear motion estimation unit 302 and the reference pictures and outputs an estimated picture.

The above-described conventional linear motion-based extrapolation and interpolation methods have a serious drawback: the underlying assumption that the objects follow a linear motion model from picture to picture often does not hold true for real visual signals.

Further, conventional motion-based extrapolation and interpolation systems do not have a one-to-one mapping property. As a result, there may be empty holes and/or superimposed positions in the estimated picture.

Another problem with these conventional motion-based extrapolation and interpolation systems is that the intensity of an object may vary from picture-to-picture due to lighting changes. As a result, estimated pictures may have inaccurate pixel values.

It is, therefore, desirable to provide an improved method and apparatus of motion estimation for visual signal extrapolation and interpolation, without the drawback of the conventional linear motion model based extrapolation and interpolation methods.

SUMMARY OF THE INVENTION

In view of the foregoing and other exemplary problems, drawbacks, and disadvantages of the conventional methods and systems, an exemplary feature of the present invention is to provide a method and system in which side information is generated using an adaptive non-linear motion model.

In a first exemplary aspect of the present invention, a method for extrapolating and interpolating a visual signal includes determining a first motion vector between a first pixel position in a first image to a second pixel position in a second image, determining a second motion vector between the second pixel position in the second image and a third pixel position in a third image, determining a third motion vector between one of the first pixel position in the first image and the second pixel position in the second image, and the second pixel position in the second image and the third pixel position in the third image using a non-linear model, and determining a position of the fourth pixel in a fourth image based upon the third motion vector.

In a second exemplary aspect of the present invention a system for extrapolating and interpolating a visual signal, includes means for determining a first motion vector between a first pixel position in a first image to a second pixel position in a second image, means for determining a second motion vector between the second pixel position in the second image and a third pixel position in a third image, means for determining a third motion vector between one of the first pixel position in the first image and the second pixel position in the second image, and the second pixel position in the second image and the third pixel position in the third image using a non-linear model, and means for determining a position of the fourth pixel in a fourth image based upon the third motion vector.

In a third exemplary aspect of the present invention a program embodied in a computer readable medium executable by a digital processing unit, includes instructions for determining a first motion vector between a first pixel position in a first image to a second pixel position in a second image, instructions for determining a second motion vector between the second pixel position in the second image and a third pixel position in a third image, instructions for determining a third motion vector between one of the first pixel position in the first image and the second pixel position in the second image, and the second pixel position in the second image and the third pixel position in the third image using a non-linear model, and instructions for determining a position of the fourth pixel in a fourth image based upon the third motion vector.

Other aspects, features and advantages of the invention will be more fully apparent from the ensuing disclosure and appended claims.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 8 illustrates a signal bearing medium 800 (e.g., storage medium) for embodying a program that is executable by a digital processing unit according to the present invention.

DETAILED DESCRIPTION OF EXEMPLARY EMBODIMENTS OF THE INVENTION

Figure 1:
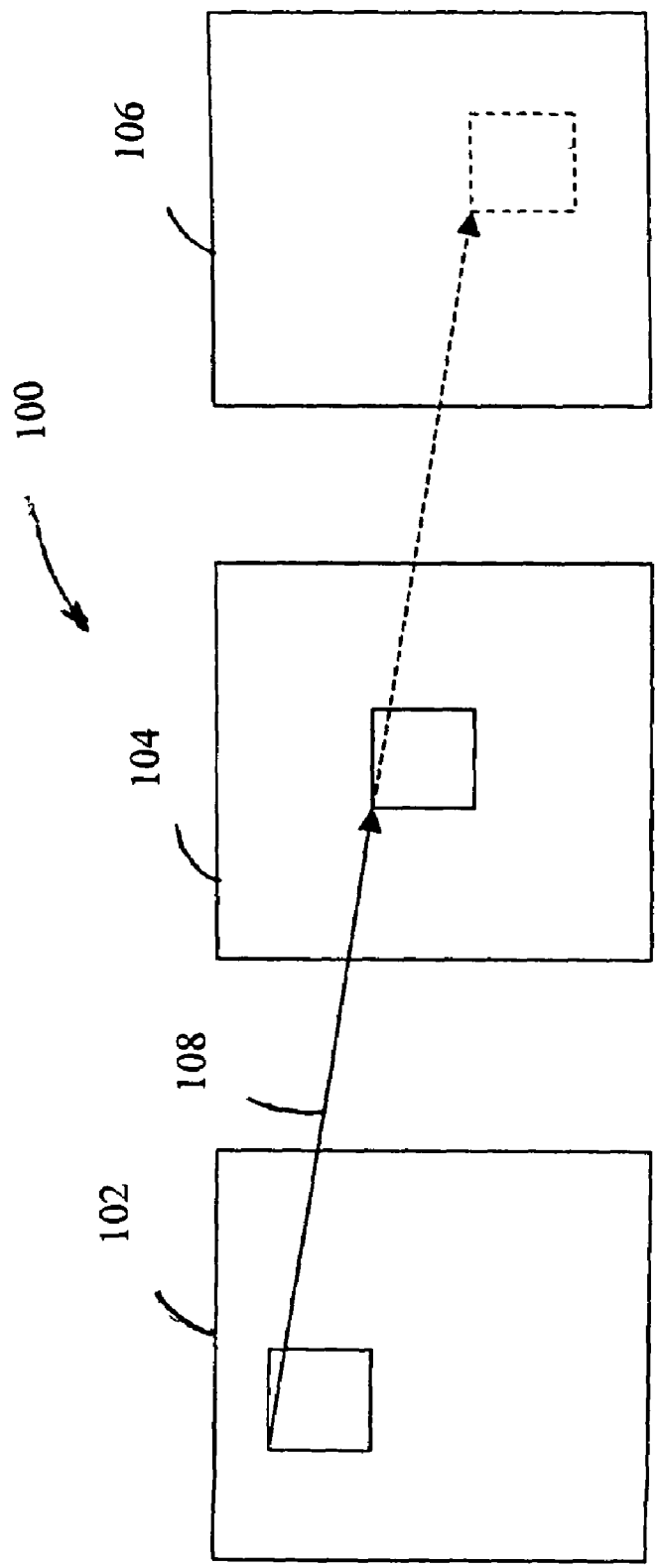
FIG. 1 illustrates a linear motion based temporal extrapolation method 100.
Figure 2:
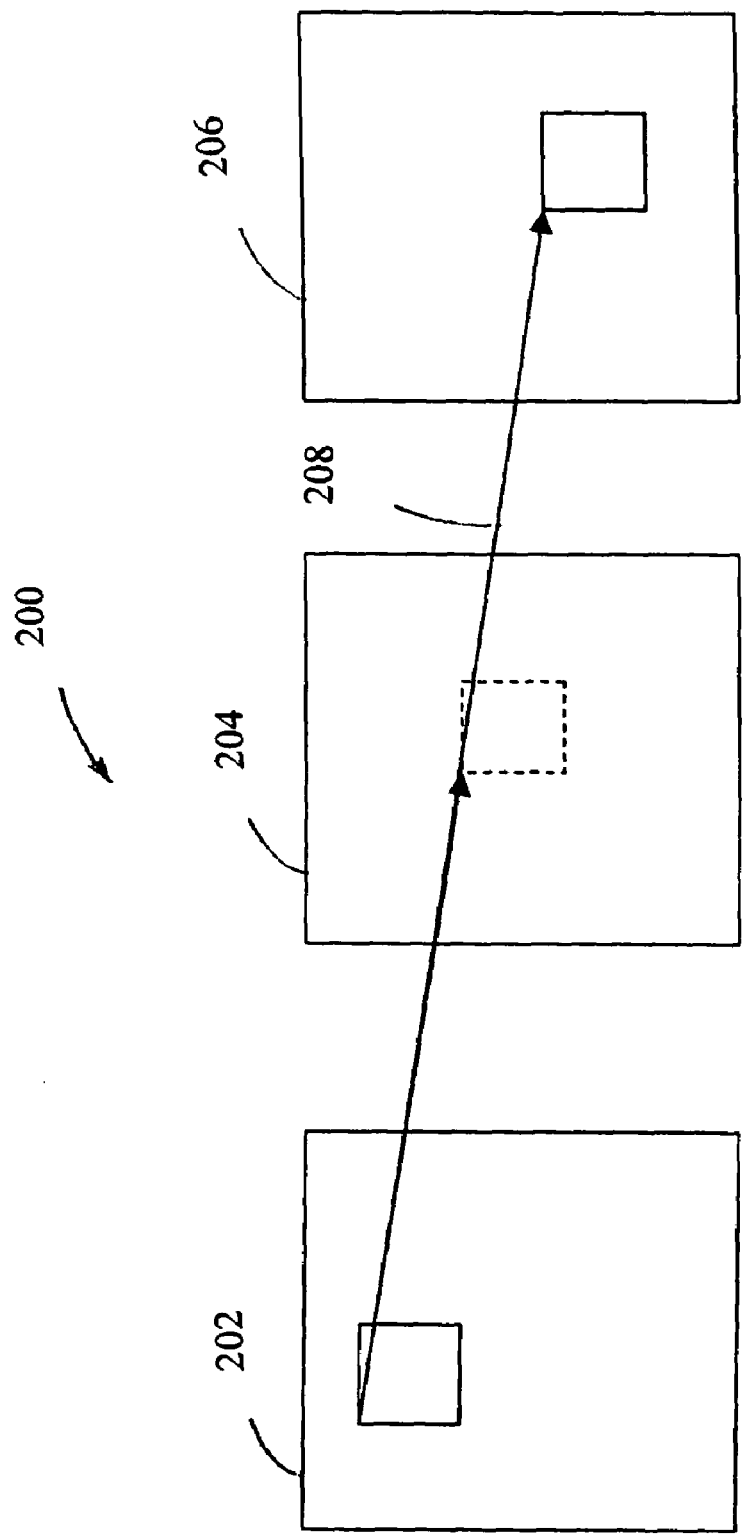
FIG. 2 illustrates a linear motion based temporal interpolation method 200.
Figure 3:
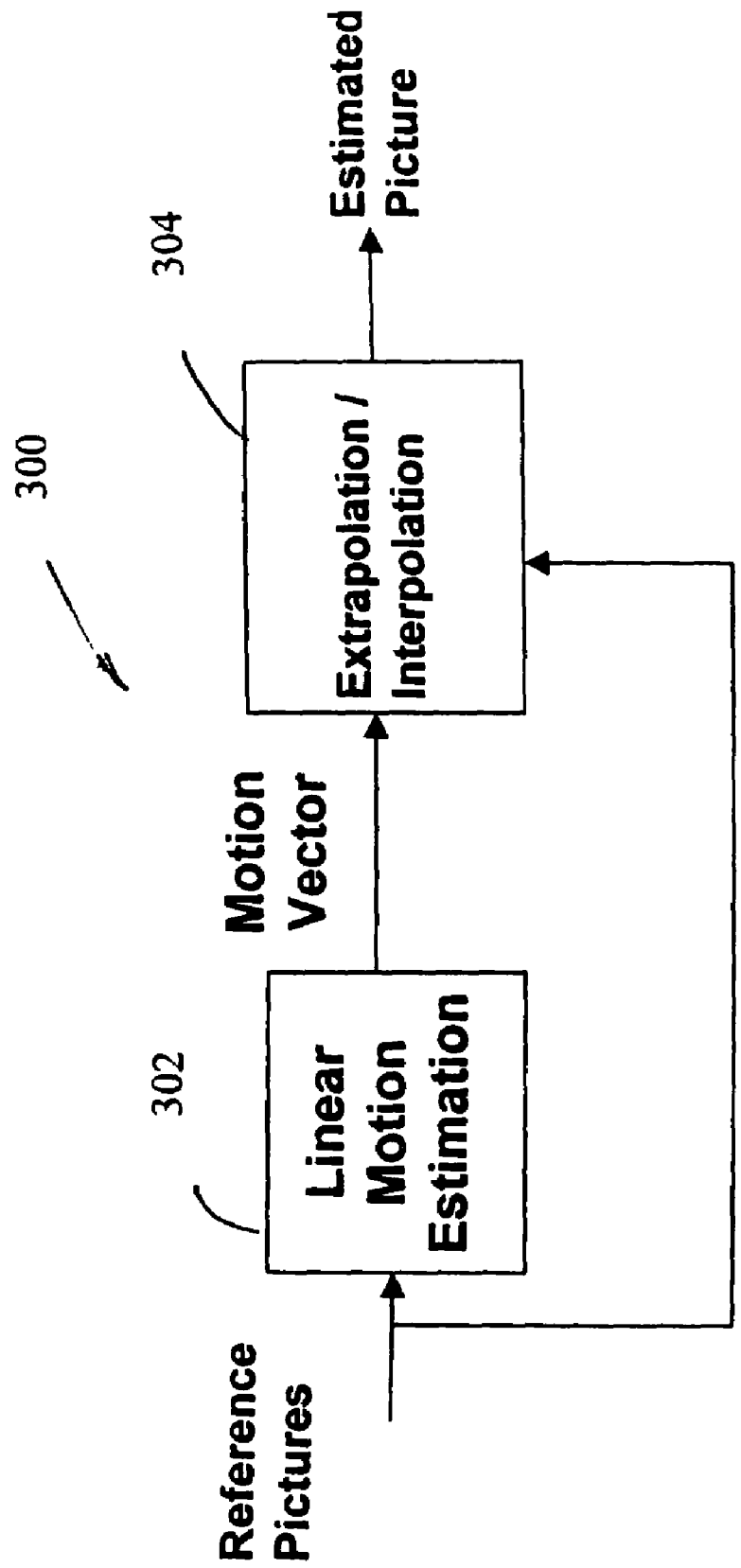
FIG. 3 illustrates a linear motion based temporal extrapolation or interpolation system 300.

Referring now to the drawings, and more particularly to FIGS. 4-9, there are shown exemplary embodiments of the methods and systems of the present invention.

The present invention provides improved methods and systems for extrapolation and interpolation using non-linear motion based estimation.

An exemplary embodiment of the present invention performs motion estimation on picture signals obtained from previously reconstructed pictures, i.e., reference pictures (or portions of pictures), to generate a set of motion vectors, which are then used to generate an estimate picture by either extrapolation, interpolation, or both from one or more of the reference pictures.

Figure 4:
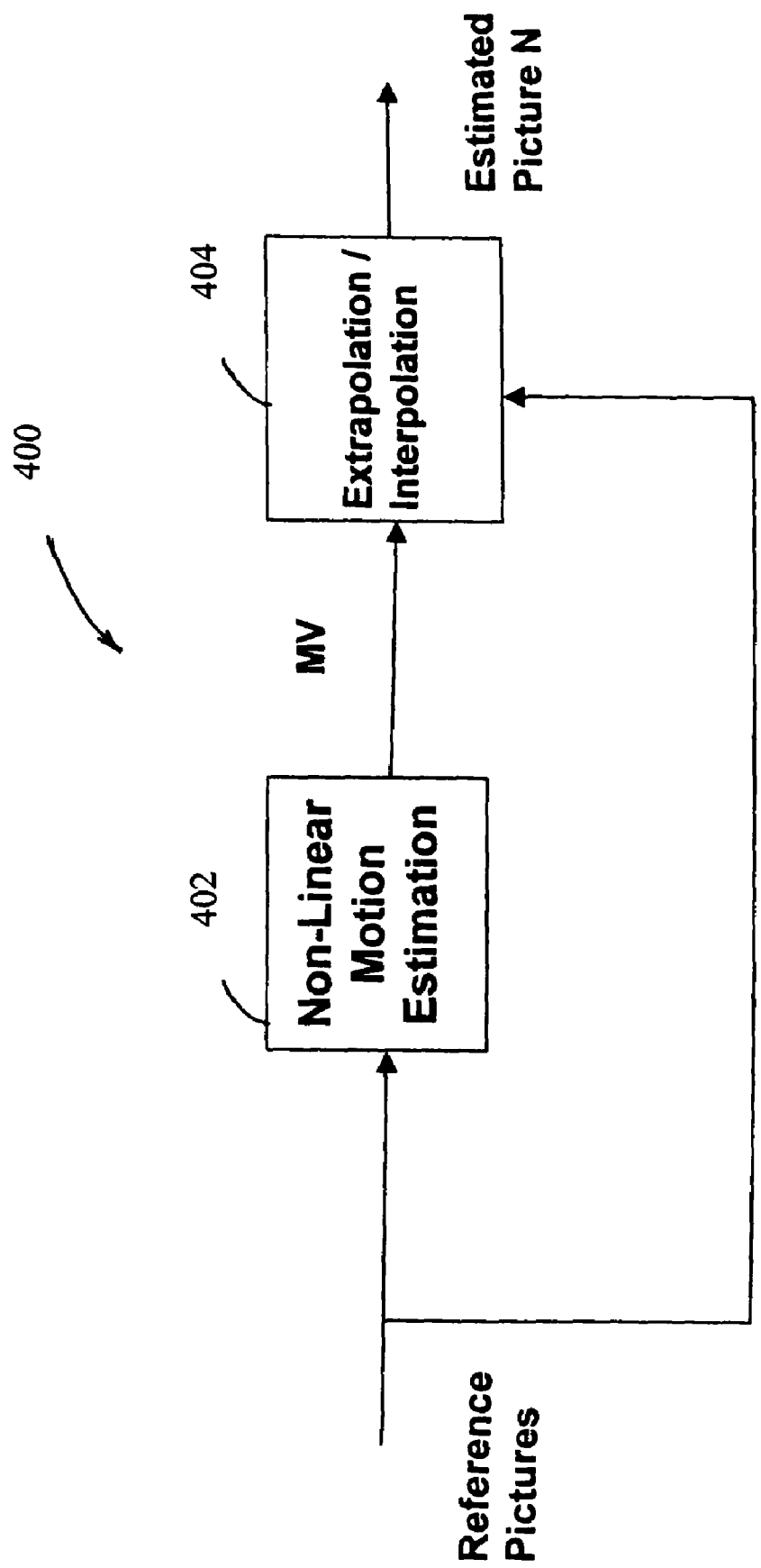
FIG. 4 illustrates an exemplary non-linear motion estimation based visual signal extrapolation or interpolation system 400 in accordance with the present invention.

FIG. 4 illustrates an exemplary non-linear motion estimation-based visual signal extrapolation or interpolation system 400 in accordance with the present invention. The system 400 includes a non-linear motion estimation unit 402 and an extrapolation/interpolation unit 404. The non-linear motion estimation unit 402 receives the reference pictures (or portions of pictures) and generates a set of motion vectors MVs based upon a non-linear model. The extrapolation/interpolation unit 404 receives the motion vectors MVs from the non-linear motion estimation unit 402 and the reference pictures and outputs an estimated picture N (or portions of a picture).

Figure 5:
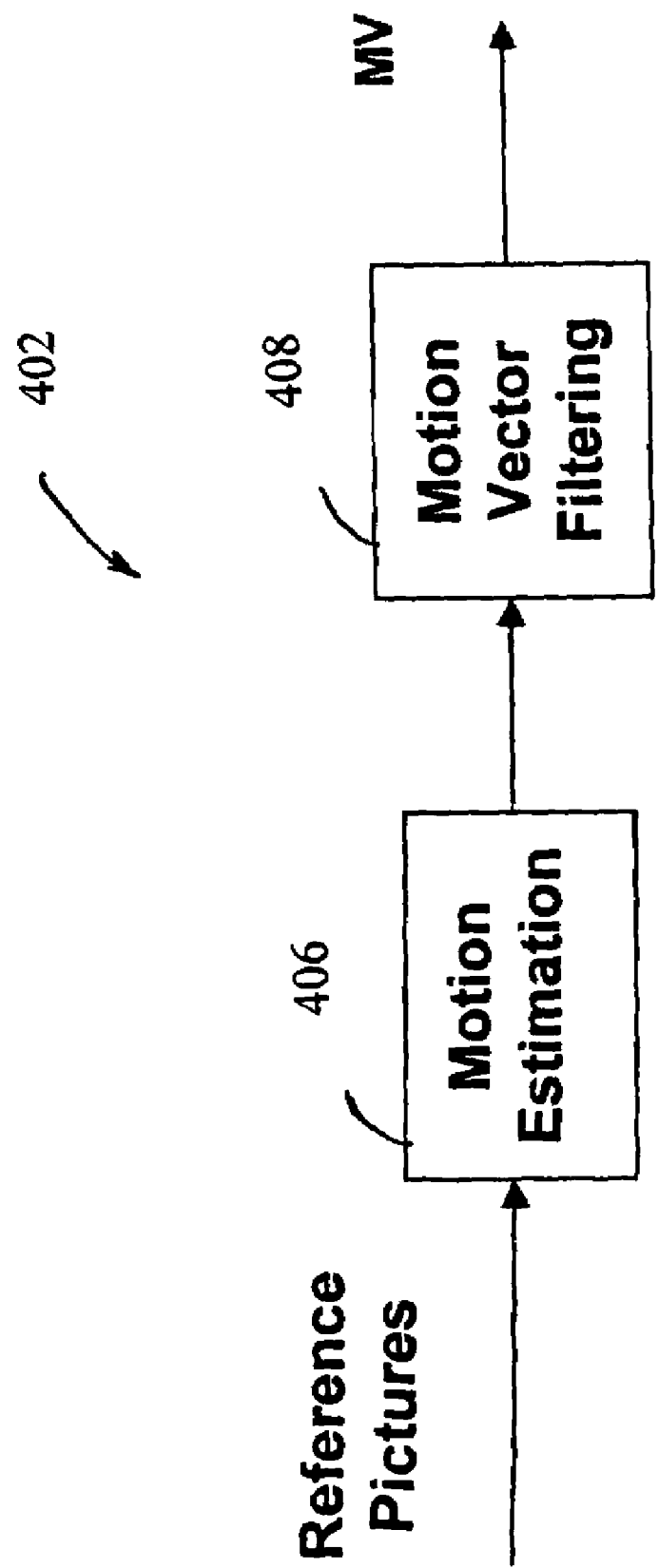
FIG. 5 is a diagram describing the exemplary non-linear motion estimation system 402 of FIG. 4.

FIG. 5 illustrates components of the non-linear motion estimation unit 402 of FIG. 4. The non-linear motion estimation unit 402 includes a motion estimation unit 406 and a motion vector filtering unit 408. These components 406 and 408 perform the methods, which are described in detail below.

Figure 6:
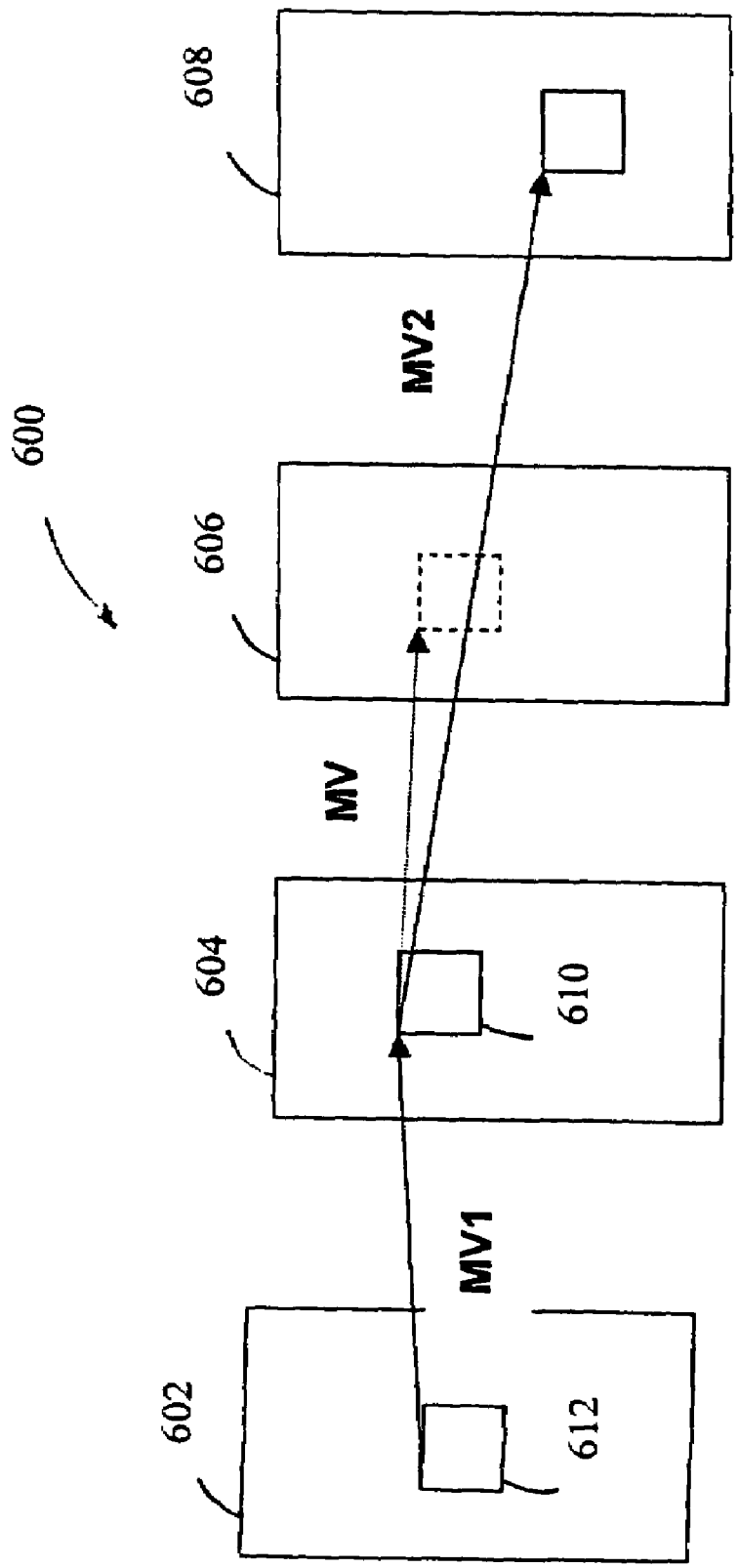
FIG. 6 illustrates an exemplary application of the present invention.

FIG. 6 illustrates an application 600 of an exemplary embodiment of the present invention which uses non-linear motion estimation to generate motion vectors for constructing an estimate picture by extrapolation or interpolation.

First, a plurality of (e.g., preferably at least three) previously decoded and reconstructed pictures, which are referred to hereinafter as the reference pictures, are obtained and stored by the decoder. These three reference pictures are referred to as N+1 608, N−1 604 and N−2 602.

For each block of pixels 610 in the reference picture N−1 604, a search process is performed to find its best match in another of the reference pictures such as, for example, picture N−2 602 (or picture N+1 608).

In order to find the best matching block B* 612 in the reference picture N−2 602 for a specific block Bi 610 in the reference picture N−1 604, a search process picks a same size block of pixels, Bp 612 from the reference picture N−2 602 and computes a distortion measure which is indicative of an error E, which, for example, can be the sum of the absolute or squared differences in pixel values, the similarity of a set of statistical features, or a combination of them between Bi 610 and Bp 612. The error E is then used to determine the best matching block B* 612 in the reference picture N−2 602 by minimizing the error E in the search process.

Once the best matching block B* 612 in the reference picture N−2 602 is determined, a set of motion vectors can be generated for the block Bi 610 in the reference picture N−1 204, which are indicative of the movement of block Bi 610 in relation to B* 612. The motion vectors can be generated from various parameters associated with blocks Bi 610 and B* 612.

In an exemplary embodiment, they are generated by taking the spatial differences (i.e., the horizontal and vertical coordinates) of blocks Bi 610 and B* 612.

The motion vectors are then filtered to reflect the non-linearity of the real motion. The output of the filtering process is a motion vector for extrapolating or interpolating a location in the picture to be decoded and reconstructed, which is referred to hereinafter as the "estimated picture" N 606, where the estimate of the block Bi resides. The pixel values of the estimate block are derived from the pixel values of blocks Bi 610 and B* 612, for example, by averaging the pixel values of these blocks or by temporally filtering pixel values.

The above-described process is repeated for each block of pixels in the reference picture N−1 604, so that the estimate of each block of pixels in the reference picture N−1 604 is mapped, thereby forming an estimated picture N 606.

Various computations as described above can be readily performed by a computer-based visual signal analyzer, which may include a general-purpose computer, a specific-purpose computer, a central processor unit (CPU), a microprocessor, or an integrated circuit that is arranged and constructed to collect and process visual signal data.

Such a visual signal analyzer may use a visual signal extrapolation or interpolation protocol for performing the above-described visual signal extrapolation or interpolation to generate estimated pictures, according to an exemplary embodiment of the present invention.

The visual signal extrapolation or interpolation protocol can be embodied in any suitable form, such as software operable in a general-purpose computer, a specific-purpose computer, or a central processor unit (CPU). Alternatively, the protocol may be hard-wired in circuitry of a microelectronic computational module, embodied as firmware, or available on-line as an operational applet at an Internet site for phase analysis.

An exemplary embodiment of the present invention may use a quadratic model to describe the motion trajectory rather than a conventional linear motion model.

A linear motion model is described by:

$$y_t = ax_t + b \tag{1}$$

where the coordinates y and x are functions of time and the temporal variable t represents the time instances when a frame sample is taken. The derivative of $y_t$ with respect to $x_t$ is:

$$\frac{dy_t}{dx_t} = a \tag{2}$$

where a is a constant.

In accordance with an exemplary embodiment of the present invention a non-linear motion estimation is used to describe the temporal motion trajectory. For example a quadratic model may be used. A quadratic model may be described by:

$$y_t = ax_t^2 + bx_t + c \tag{3}$$

The coefficients a, b, and c may be estimated through pixel point data. For example, through the motion estimation method described above, the points $(x_t, y_t)$ are $(x_{N-2}, y_{N-2})$, $(x_{N-1}, y_{N-1})$, and $(x_{N+1}, t_{N+1})$ at the time instants N−2, N−1, and N+1, respectively, can be found. These points reside on Pictures N−2, N−1, and N+1 and form a motion trajectory described by Equation (3). Then, from Equation (3), are the followings equations:

$$y_{N-2} = ax_{N-2}^2 + bx_{N-2} + c; \tag{4}$$

$$y_{N-1} = ax_{N-1}^2 + bx_{N-1} + c; \text{ and} \tag{5}$$

$$y_{N+1} = ax_{N+1}^2 + bx_{N+1} + c. \tag{6}$$

Subtracting (5) or (6) from (4), provides, respectively:

$$y_{N-2} - y_{N-1} = a(x_{N-2}^2 - x_{N-1}^2) + b(x_{N-2} - x_{N-1}), \text{ and} \tag{7}$$

$$y_{N-2} - y_{N+1} = a(x_{N-2}^2 - x_{N+1}^2) + b(x_{N-2} - x_{N-1}). \tag{8}$$

Solving (7) and (8) for a and b, provides:

$$a = \frac{(y_{N-2} - y_{N-1})(x_{N-1} - x_{N+1}) - (y_{N-2} - y_{N+1})(x_{N-2} - x_{N-1})}{(x_{N-2} - x_{N-1})(x_{N-2} - x_{N+1})(x_{N-1} - x_{N+1})}; \tag{9}$$

-continued $$b = \frac{(y_{N-2} - y_{N+1})(x_{N-2}^2 - x_{N-1}^2) - (y_{N-2} - y_{N-1})(x_{N-2}^2 - x_{N+1}^2)}{(x_{N-2} - x_{N-1})(x_{N-2} - x_{N+1})(x_{N-1} - x_{N+1})}. \quad (10)$$

Once a and b are determined, the parameter c can be solved using, for example Equation (4):

$$c = ax_{N-2}^2 + bx_{N-2} - y_{N-2}. \quad (11)$$

The coordinates (x,y) in the estimated picture N where the motion trajectory passes at the time instant N can be determined as follows.

Taking the derivative of y with respect to x, results in:

$$\frac{dy}{dx} = 2ax + b. \quad (12)$$

Using the known corresponding points in Picture N−1 and Picture N+1:

$$y_N - y_{N-1} = (2ax_N + b)(x_N - x_{N-1}), \quad (13)$$

$$y_{N+1} - y_N = (2ax_N + b)(x_{N+1} - x_N), \quad (14)$$

Solving for $x_N$ and $y_N$, we get $$x_N = \frac{y_{N+1} - y_{N-1} + b(x_{N-1} - x_{N+1})}{2a(x_{N+1} - x_{N-1})},$$

$$y_N = \frac{[y_{N+1} - y_{N-1} + b((x_{N-1} - x_{N+1})]^2}{2a(x_{N+1} - x_{N-1})^2} + \quad (15)$$
$$\frac{(b - 2ax_{N+1})[y_{N+1} - y_{N-1} + b(x_{N-1} - x_{N+1})]}{2a(x_{N+1} - x_{N-1})} + y_{N+1} - bx_{N+1}.$$

The motion vectors $MV_1 = (mvx_1, mvy_1)$ and $MV_2 = (mvx_2, mvy_2)$ in FIG. 5 can be calculated, respectively, by $$mvx_1 = x_{N-1} - x_{N-2}, \ mvy_1 = y_{N-1} - y_{N-2}; \text{ and} \quad (16)$$

$$mvx_2 = x_{N+1} - x_{N-1}, \ mvy_2 = y_{N+1} - y_{N-1}. \quad (17)$$

Substitute these values into Equation (15), provides $$x_N = \frac{mvy_2 - bmvx_2}{2amvx_2} = \frac{1}{2a}\left[\frac{mvy_2}{mvx_2} - b\right], \quad (18)$$

$$y_N = \quad (24)$$
$$\frac{[mvy_2 - bmvx_2]^2}{2a(mvx_2)^2} + \frac{(b - 2ax_{N+1})[mvy_2 - bmvx_2]}{2amvx_2} + y_{N+1} - bx_{N+1}.$$

In this manner, an exemplary embodiment of the invention may determine the motion vector MV or the coordinates ($x_N$, $y_N$) of the point in Picture N in accordance with the present invention.

While the invention has been described in terms of an exemplary embodiment, those skilled in the art will recognize that the invention can be readily extended to estimate motions with other non-linear models.

Figure 7:
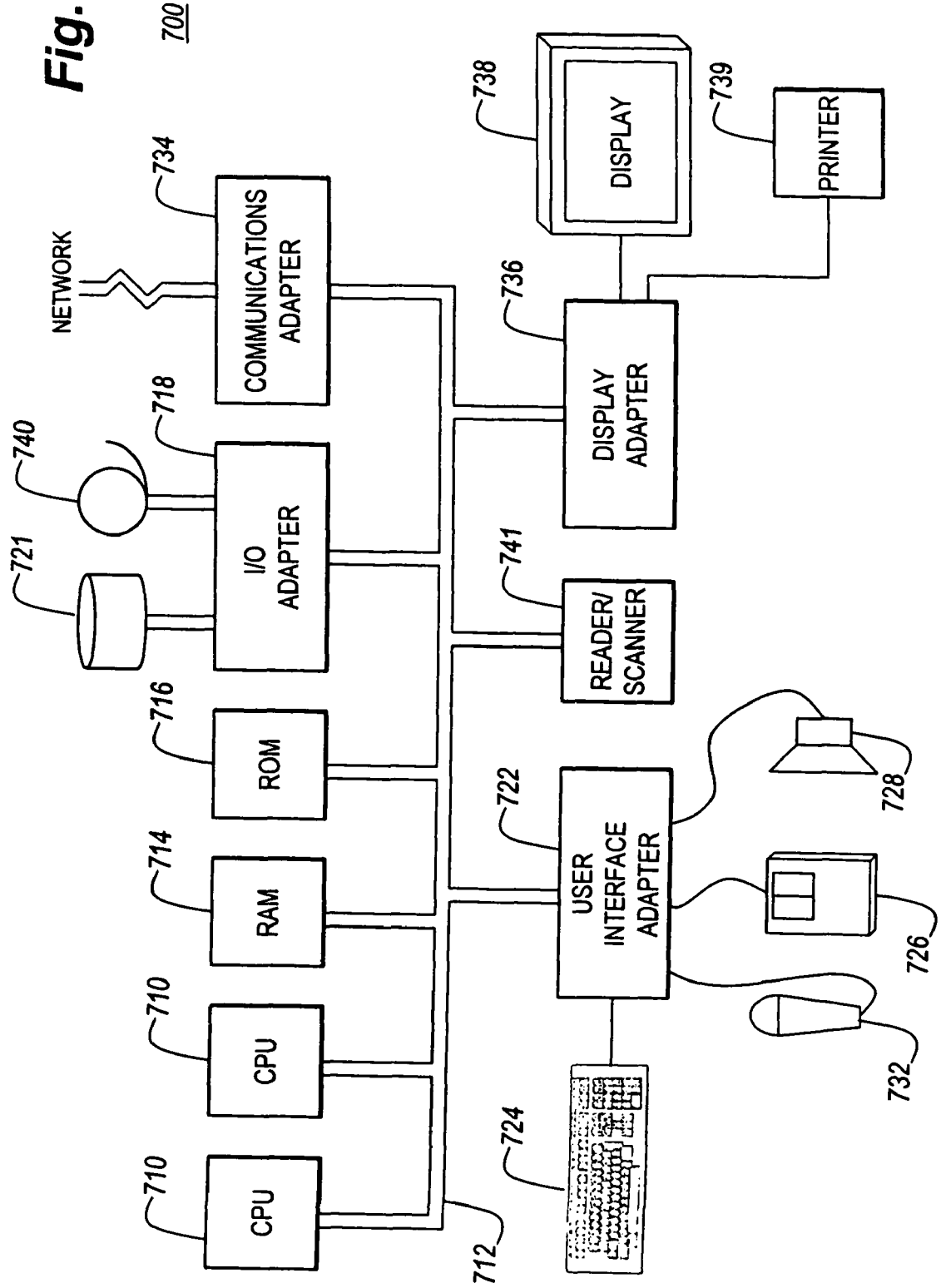
FIG. 7 illustrates an exemplary hardware/information handling system 700 for incorporating the present invention therein.

Referring now to FIG. 7, system 700 illustrates a typical hardware configuration that may be used for implementing an exemplary embodiment of the present invention. The configuration may have preferably at least one processor or central processing unit (CPU) 710. The CPUs 702 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including a program embodied in a computer readable medium executable by a digital processor. Such a method may be implemented, for example, by operating the CPU 710 to execute a sequence of machine-readable instructions. These instructions may reside in various types of signal bearing media. Thus, this aspect of the present invention is directed to a program embodied in a computer readable medium executable by a digital processor incorporating the CPU 710 and hardware above, to perform a method in accordance with the present invention.

This signal-bearing media may include, for example, a RAM (not shown) contained within the CPU 710, as represented by the fast-access storage for example.

Alternatively, the instructions may be contained in another signal-bearing media, such as a magnetic data storage diskette 800, CD-ROM 802, or the like as illustrated by FIG. 8. These instructions may be directly or indirectly accessible by the CPU 710.

Whether contained in the computer server/CPU 710, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may comprise software object code, complied from a language such as "C," etc.

Figure 9:
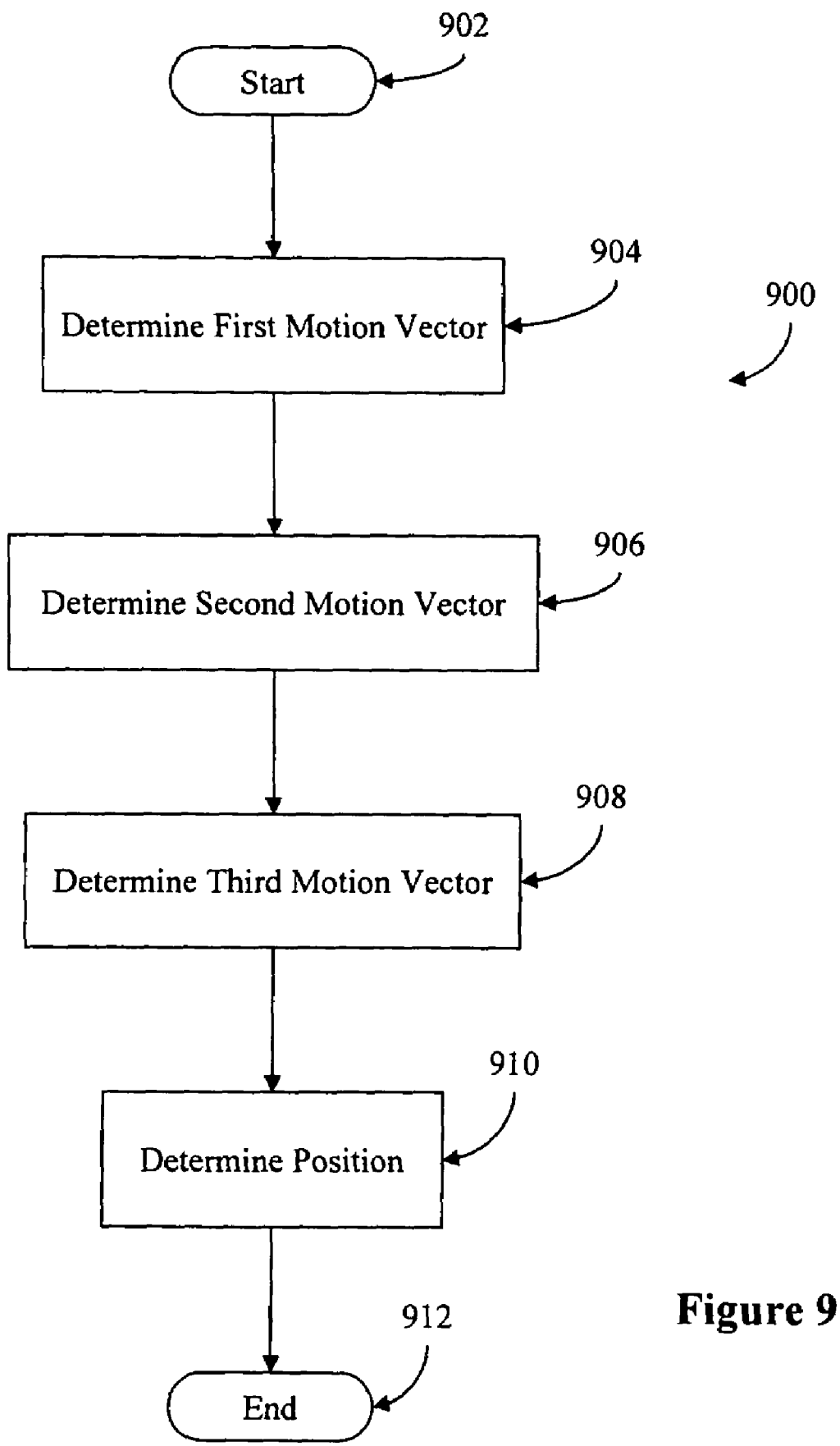
FIG. 9 is a flowchart illustrating one exemplary method 900 in accordance with the present invention.

FIG. 9 illustrates a flowchart for a method 900 in accordance with an exemplary embodiment of the invention. The flowchart starts at step 902 and continues to step 904 where a first motion vector between a first pixel position in a first image to a second pixel position in a second image is determined. The flowchart continues to step 904 where a second motion vector between the second pixel position in the second image and a third pixel position in a third image is determined. The flowchart continues to step 908 where a third motion vector between one of the first pixel position in the first image and the second pixel position in the second image, and the second pixel position in the second image and the third pixel position in the third image using a non-linear model is determined. The flowchart continues to step 920 where a position of the fourth pixel in a fourth image based upon the third motion vector is determined.

Although the invention has been variously disclosed herein with reference to illustrative embodiments and features, it will be appreciated that the embodiments and features described above are not intended to limit the invention, and that other variations, modifications and alternative embodiments will readily suggest themselves to those of ordinary skill in the art. The invention therefore is to be broadly construed, as including such variations, modifications and alternative embodiments.

While the invention has been described in terms of several exemplary embodiments, those skilled in the art will recognize that the invention can be practiced with modification.

For example, an exemplary embodiment of this invention can also be advantageously applied to other cases that may involve temporal extrapolation and interpolation, such as video frame rate up-conversion, error concealment, visual signal rendering, etc It is noted that "images" used herein cam be a portion of an image.

Further, it is noted that, Applicant's intent is to encompass equivalents of all claim elements, even if amended later during prosecution.

What is claimed is:

1. A method of at least one of extrapolating and interpolating a visual signal, comprising:
   determining a first motion vector between a first pixel position in a first image to a second pixel position in a second image;
   determining a second motion vector between said second pixel position in said second image and a third pixel position in a third image;
   determining a third motion vector between one of said first pixel position in said first image and said second pixel position in said second image, and said second pixel position in said second image and said third pixel position in said third image using a non-linear model; and
   determining a position of the fourth pixel in a fourth image based upon said third motion vector.

2. The method of claim 1, wherein said determining said third motion vector comprises filtering said first motion vector and said second motion vector to generate said third motion vector, which reflects a non-linearity of motion between said first image, said second image, and said third image.

3. The method of claim 1, wherein said determining said third motion vector comprises determining said third motion vector using a non-linear model.

4. The method of claim 3, wherein said non-linear model comprises one of a non-linear interpolation model and a non-linear extrapolation model.

5. The method of claim 1, wherein said determining said third motion vector comprises determining said third motion vector using a polynomial model.

6. The method of claim 5, wherein said polynomial model comprises a quadratic model.

7. The method of claim 1, wherein said determining said third motion vector comprises determining said third motion vector using a circular model.

8. The method of claim 1, wherein said determining said third motion vector comprises determining said third motion vector using a parabolic model.

9. The method of claim 1, wherein said determining a third motion vector comprises determining said third motion vector using a cubic spline model.

10. A system for at least one of extrapolating and interpolating a visual signal, comprising:
    means for determining a first motion vector between a first pixel position in a first image to a second pixel position in a second image;
    means for determining a second motion vector between said second pixel position in said second image and a third pixel position in a third image;
    means for determining a third motion vector between one of said first pixel position in said first image and said second pixel position in said second image, and said second pixel position in said second image and said third pixel position in said third image using a non-linear model; and
    means for determining a position of the fourth pixel in a fourth image based upon said third motion vector.

11. The system of claim 10, wherein said means for determining said third motion vector comprises means for filtering said first motion vector and said second motion vector to generate said third motion vector, which reflects a non-linearity of motion between said first image, said second image, and said third image.

12. The system of claim 10, wherein said means for determining said third motion vector comprises means for determining said third motion vector using a non-linear model.

13. The system of claim 12, wherein said means for determining said third motion vector using said non-linear model comprises one of a means for determining said third motion vector using non-linear interpolation and means for determining said third motion vector using non-linear extrapolation.

14. The system of claim 10, wherein said means for determining said third motion vector comprises means for determining said third motion vector using a polynomial model.

15. The system of claim 14, wherein said polynomial model comprises a quadratic model.

16. The system of claim 10, wherein said means for determining said third motion vector comprises means for determining said third motion vector using a circular model.

17. The system of claim 10, wherein said means for determining said third motion vector comprises means for determining said third motion vector using a parabolic model.

18. The system of claim 10, wherein said means for determining said third motion vector comprises means for determining said third motion vector using a cubic spline model.

19. A non-transitory computer-readable storage medium including computer-readable instructions capable of executing a method of at least one of extrapolating and interpolating a visual signal, said method comprising:
    determining a first motion vector between a first pixel position in a first image to a second pixel position in a second image;
    determining a second motion vector between said second pixel position in said second image and a third pixel position in a third image;
    determining a third motion vector between one of said first pixel position in said first image and said second pixel position in said second image, and said second pixel position in said second image and said third pixel position in said third image using a non-linear model; and
    determining a position of the fourth pixel in a fourth image based upon said third motion vector.

20. The non-transitory computer-readable storage medium of claim 19, wherein said determining said third motion vector comprises filtering said first motion vector and said second motion vector to generate said third motion vector, which reflects a non-linearity of motion between said first image, said second image, and said third image.

* * * * *